United States Patent [19]
Kushnir, Jr. et al.

[11] Patent Number: 6,158,821
[45] Date of Patent: Dec. 12, 2000

[54] 26-TYPE CONTROLLED PNEUMATIC ACCESS PLATE

[75] Inventors: Lawrence M. Kushnir, Jr., North Huntingdon; Ralph Santoro, Jr., New Kensington, both of Pa.

[73] Assignee: Westinghouse Air Brake Company, Wilmerding, Pa.

[21] Appl. No.: 09/106,536

[22] Filed: Jun. 29, 1998

[51] Int. Cl.[7] .............................. B60T 13/74; B60T 8/34
[52] U.S. Cl. .................................. 303/3; 303/7; 303/128
[58] Field of Search .................... 303/3, 7, 9.61, 303/15, 20, 122.08, 128

[56] References Cited

U.S. PATENT DOCUMENTS

| | | | |
|---|---|---|---|
| 4,659,149 | 4/1987 | Rumsey et al. | 303/3 |
| 5,039,940 | 8/1991 | Johnson et al. | 324/158 R |
| 5,564,795 | 10/1996 | Engle | 303/9 |

FOREIGN PATENT DOCUMENTS

| | | | |
|---|---|---|---|
| 829 402 A2 | 3/1998 | European Pat. Off. | 303/3 |

Primary Examiner—Chris Schwartz
Attorney, Agent, or Firm—James Ray & Associates

[57] ABSTRACT

An access plate which provides entry to a pneumatic braking system for the purpose of overlaying this system with an electronic controlled pneumatic system for a train braking system. This access plate allows entry into ports necessary to make brake applications from an electronic/programmed controlled unit or an equivalent thereof. This access plate has particular utility for accessing 26 porting and is one part of the entire unit that allows access to 26-type equipment for the purpose of overlaying features with an electronic controlled pneumatic braking system. This access plate provides access to porting to allow all of the advantages of electronic controlled braking to take effect such as shorter stopping distances, system performance feedback, and continuous recharging features. The present invention also provides a device on the access plate for accessing the necessary porting involved with doing a single car test within a 26-Type braking arrangement.

15 Claims, 3 Drawing Sheets

26-TYPE CONTROLLED PNEUMATIC ACCESS PLATE

CROSS-REFERENCE TO RELATED APPLICATIONS

This application is related to co-pending application Ser. No. 09/106,533, entitled "26-Type Electronic Controlled Pneumatics", filed Jun. 29, 1998. This patent application is assigned to the Westinghouse Airbrake Company, the assignee of the present invention, and its teachings are incorporated into the present document by reference. This application is also related to co-pending application Ser. No. 106,697, entitled "26-Type Electronic Controlled Pneumatics Conversion Block", filed Jun. 29, 1998 and is also assigned to the assignee of the present invention.

FIELD OF THE INVENTION

The present invention relates, in general, to railway vehicle brake equipment and, more particularly, the present invention is directed to an access plate which provides entry to a pneumatic braking system for the purpose of overlaying this system with an electronic controlled pneumatic system for train braking systems. This access plate allows entry into ports necessary to make brake applications from an electronic/programmed controlled unit or an equivalent thereof. Still, more particularly, the present invention is directed to an access plate which provides entry to a 26-Type braking system for the purpose of overlaying this system with an electronic controlled system. In addition, this plate allows porting such that related single car testing features can be accessed and a test of the braking features of the car control valve can be completed.

BACKGROUND OF THE INVENTION

A "26-L" air brake system is an equipment package which has been designed to meet present day train handling requirements. This system uses air, under pressure, for the braking of locomotives and trailing freight or passenger vehicles. This system has been designed and developed by the Westinghouse Airbrake Company (WABCO), the assignees of the present invention.

A "26-L" system can include either a "26-C" air brake control valve or a "26-F" air brake control valve as the primary controlling device in this equipment arrangement. These valves provide the manual means for initiating air brake application and releases.

The "26-C" valve is used for passenger locomotives and cars. The "26-F" valve is used for freight locomotives and cars. The present invention can be applied to either the "26-C" or the "26-F" system and thus the term 26-Type is meant to encompass either of these braking systems.

The 26-Type braking system relies on the transfer of air down the train, which propagates at a certain time frame, to achieve stopping of the train. This type of braking system has several disadvantages. One disadvantage of the system is the requirement of the train to have a long enough stopping distance to compensate for the time it takes for the air to be transferred down the train. Also, care must be taken to ensure that the air supply has been sufficiently replenished after a brake application or a series of brake applications prior to another brake application. Additionally, this currently used 26-Type braking system is limited in the number of units that may be placed within a train consist because of the system's inability to react quickly to reductions at the lead unit over long distances.

A system for electronically controlling the pneumatics of the 26-Type braking system which overcomes the disadvantages of the currently used 26-Type braking systems is the subject of the aforementioned co-pending application entitled "26-Type Electronic Controlled Pneumatics".

There is currently no industry invention that allows access to 26-Type braking systems through some sort of accessible device or plate. Other types of electronic controlled pneumatic systems are available in the marketplace, however, these systems are only designed to access freight braking systems using related freight braking devices. No access plates are currently available to allow entry to a 26-Type system, or more particularly a 26F or 26C control valve, a system which allows for the graduated release of brake cylinder pressure.

The present invention is directed to an access plate which provides access to porting to allow for electronic controlled braking of 26-Type braking systems.

Additionally, there are no access plates related to 26-Type equipment that allow for single car testing features while the car control valve is on the overall unit. The present invention will enable an operator to perform this single car testing.

SUMMARY OF THE INVENTION

An object of the present invention is to provide a means or an access plate for providing entry to a pneumatic braking system for the purpose of overlaying the system with an electronic controlled system. The present invention is particularly directed to 26-Type braking systems. This access plate will allow entry into the ports necessary to make brake applications from an electronic/programmed controlled unit or equivalent.

Another object of the invention is to provide a plate which includes porting such that related single car testing features can be accessed therefrom. This capability will allow for the testing of the car brake control valve while this valve is still on the overall unit.

The access plate can be used in pipe bracket mounting applications or in remote mounted locations. In the remote mounted location, the plate allows access to systems, particularly 26-Type systems, that are mounted in a laminate fashion, with special attention made to the pipe tap arrangement consistent with this type of application.

The above objects are achieved through the use of an access plate, (sometimes referred to as an adapter plate) which is sandwiched between the 26-Type control valve and the 26-Type bracket. The access plate is connected with a conversion block, which ultimately provides access to the standard electronic unit assembly. The standard electronic unit assembly controls the brake application. The access plate provides connections to the following ports of the 26-Type control valve both as part of the pipe bracket and remote mounted unit: the control reservoir, the auxiliary reservoir, the brake pipe, the 16 pipe, the 10 pipe, and the 16 pipe release.

This access plate, used in conjunction with an electronic controlled pneumatic (ECP) related system, provides to the user all of the advantages consistent with an electronic controlled pneumatic braking system, which includes shorter stopping distance, system performance feedback, and continuous re-charging features.

DETAILED DESCRIPTION OF THE INVENTION

The present invention is directed to an access (or adapter) plate which is one part of the entire unit that allows access to 26-Type equipment for the purpose of overlaying features with an electronic controlled pneumatic braking system.

Figure 1:
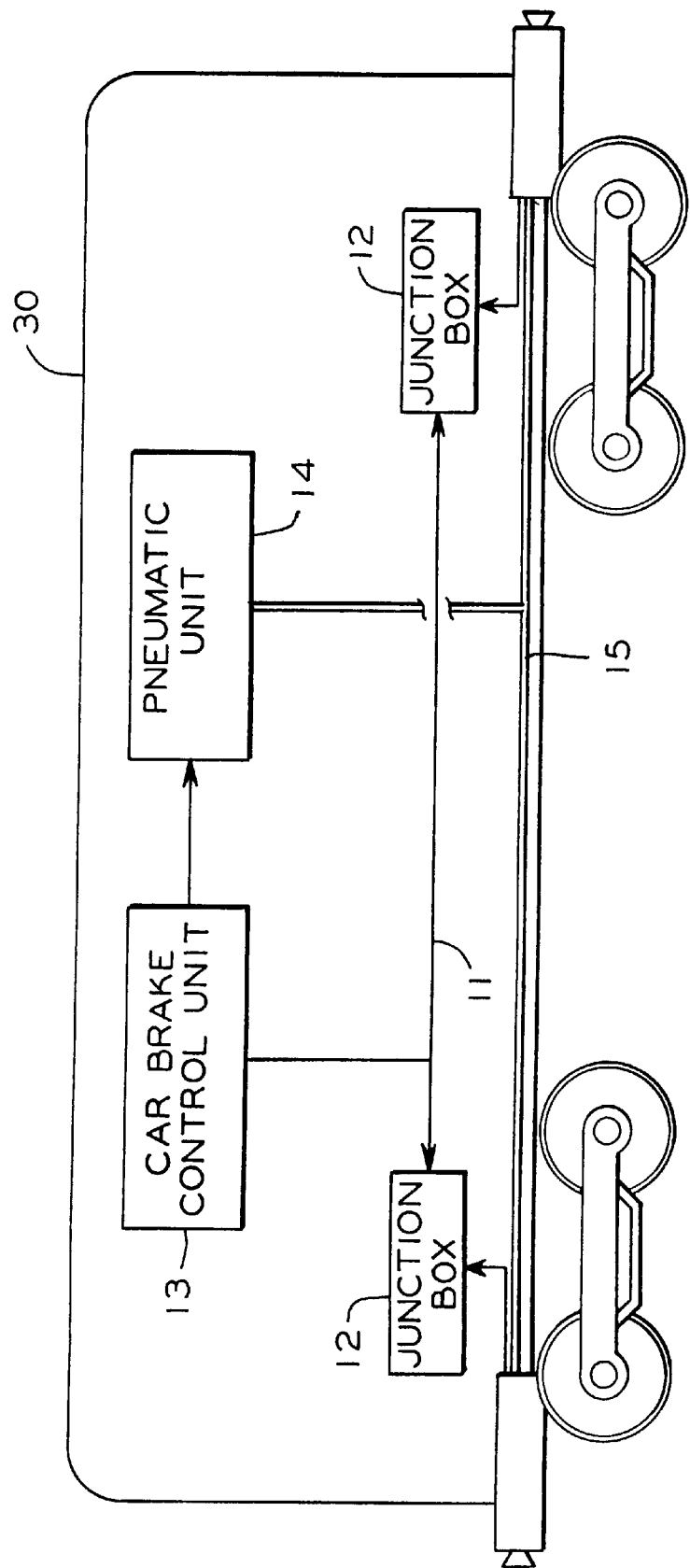
FIG. 1 shows an overview of an electronic controlled pneumatic passenger car system.

FIG. 1 shows a single car 30 within a train consist including the individual components for electronically controlling the air brake cylinders of the car. Typically each car 30 within the train consist will include these components, however, this system may be designed such that these components would not be required on every car. This may be the case, for example, on cars which are connected together in a semi-permanent manner and would only be disconnected for repairs. The car 30 includes trainline or intratrain communication means 11 for transmitting at least brake application and/or brake release communications down the train. Note that other types of communications may be transmitted along this intratrain communication means. Junction boxes 12 are located at each end of the car 30 to receive at least these brake application and/or brake release communications from the intratrain communication line 11 and to convert these communication signals to an acceptable input level, such as by dropping the voltage level, so that they may be fed to the ECP (electronic controlled pneumatic) car control unit 13. The ECP car control unit 13 may also be referred to as the central control unit. This unit holds the software for controlling the pneumatic unit or valve 14 as well as many electronics transfer features for the system. The pneumatic unit 14 contains electropneumatic and pneumatic valves which react to the electronic signals sent from the ECP car control unit 13 and delivers the final input pressure via the brake pipe 15 to the car brake cylinders, based upon this signal.

The electronic controlled pneumatic braking system may be applied to either a standard braking system or to a relayed system. A relayed system requires the provision of a relay valve 21, such as a J-Relay to discharge the output pressure from the pneumatics unit or valve 14 to the brake cylinder, whereas in a standard system, the output pressure is fed directly from the pneumatics valve 14. A relayed system is used when longer cars are used in the train.

Figure 2:
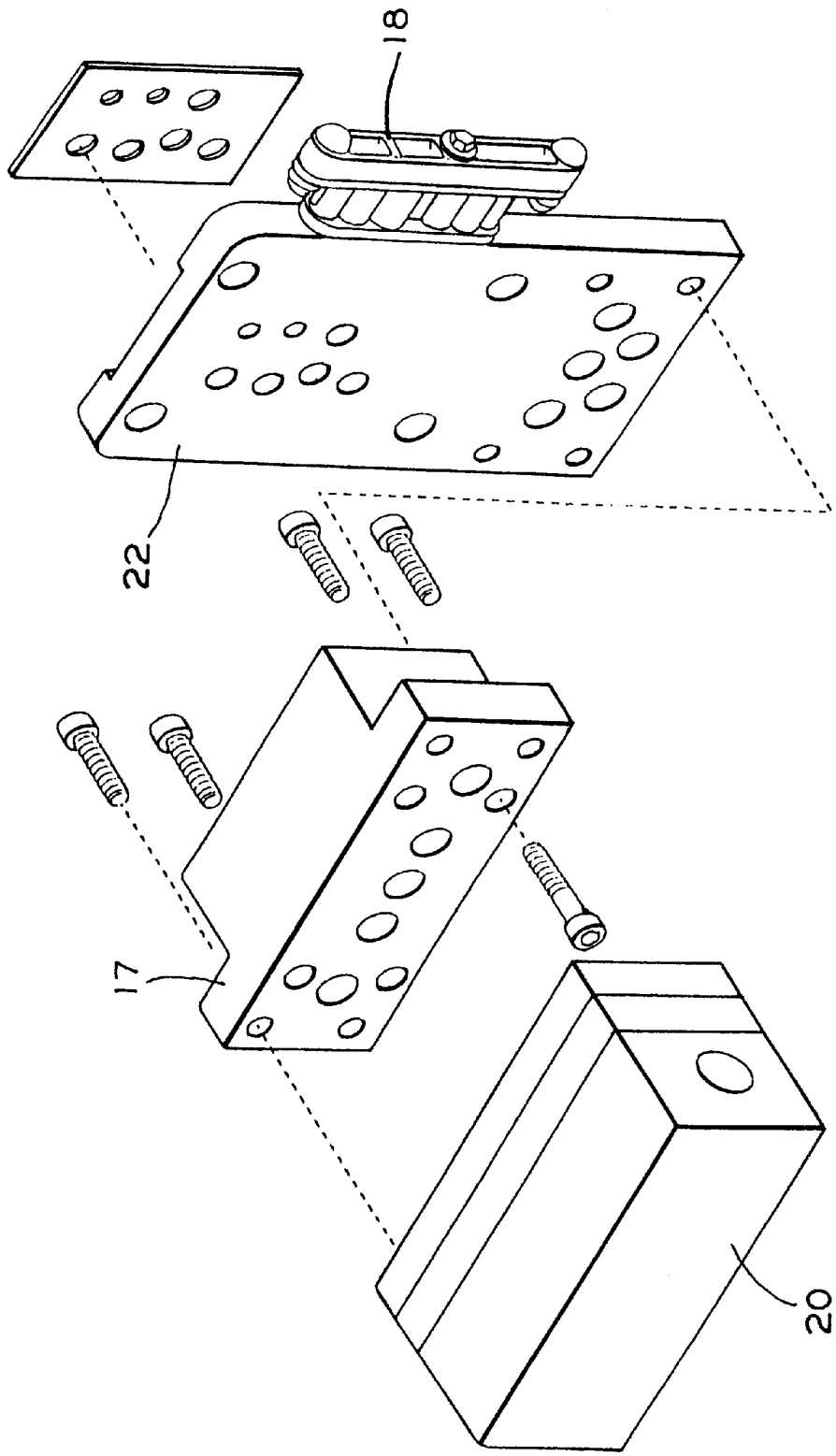
FIG. 2 shows an access plate arrangement of the present invention which is to be used in an electronic controlled pneumatic braking system.

FIG. 2 shows an access plate arrangement of the present invention which is to be used in an electronic controlled pneumatic braking system. The access plate 22, also referred to as an adapter plate, provides connections to several ports of the 26-type control valve. These ports include that of the control reservoir, the auxiliary reservoir, the brake pipe, the 16 pipe, the 10 pipe, and the 16 pipe release. The access plate 22 is connected with the conversion block, 17. A standard electronics box assembly or electronic unit 20 is also connected to the conversion block 17. It is the standard electronics box 20 which allows for electronic control of the brake application.

The access plate 22 also provides the access to the necessary porting 18 to perform a single car test. A cover plate is removed from a side of the access plate to expose porting 18 from which a single car test device can be hooked up and a test of the braking features of the car control valve can be completed.

Figure 3:
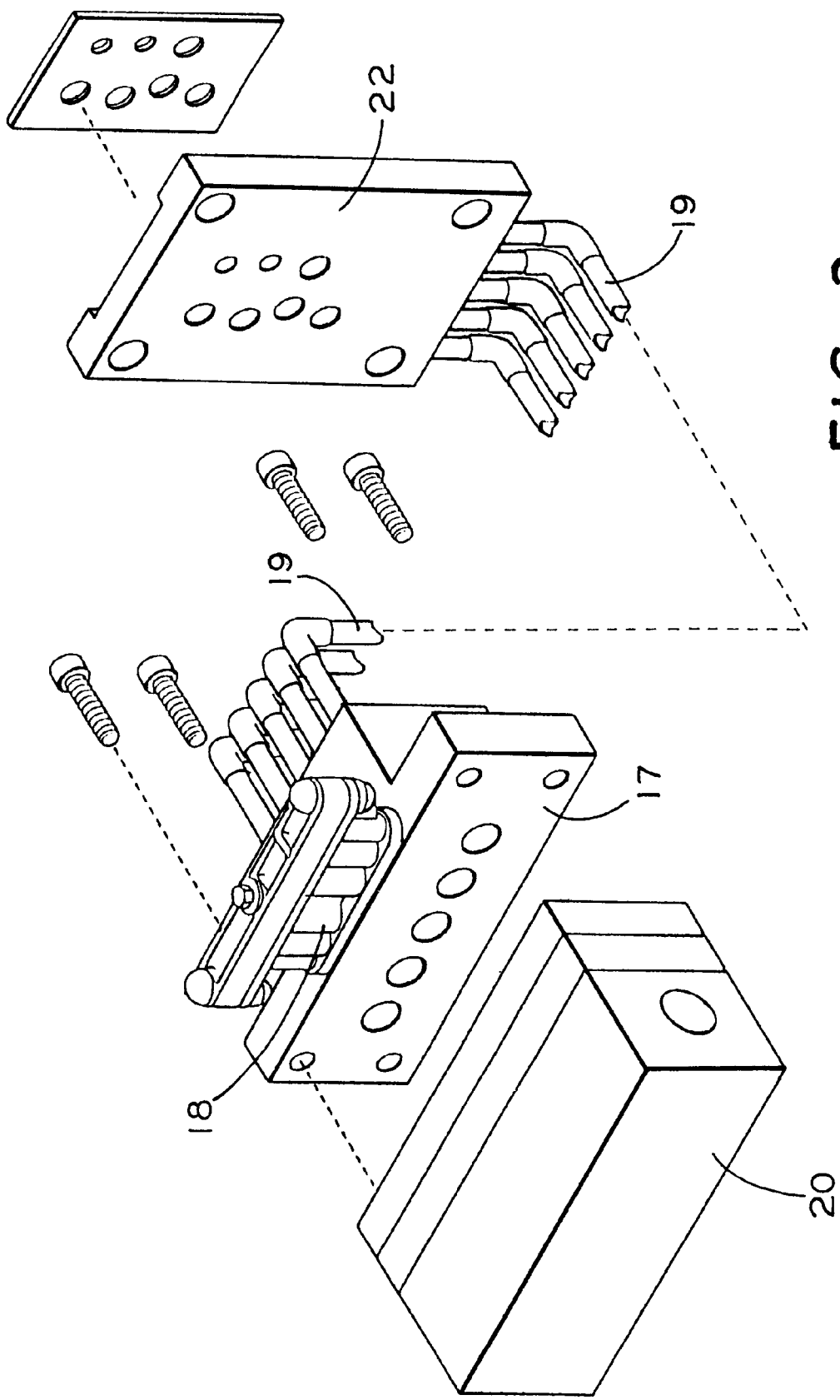
FIG. 3 shows an access plate arrangement of the present invention for use in a remote mounting arrangement on a laminated system setup which is to be used in an electronic controlled pneumatic braking arrangement.

FIG. 3 shows an access plate arrangement of the present invention for use in a remote mounting arrangement on a laminated system setup. Components having identical functions as have been described in FIG. 2 will be represented by the same reference numerals. FIG. 3 shows piping or tubing 19 between the conversion block 17 and the access or adapter plate 22. Through this piping or tubing, the access plate 22 can facilitate connections with other apparatuses which are not directly connected to the unit. Additionally, the conversion block 17 includes porting 18 from which a single car test may be performed.

The access plate of the present invention provides access to porting to allow for electronic control of 26-Type braking systems. Electronic control of 26-Type braking systems has advantages over currently used 26-Type braking systems in that it allows for an almost instantaneous application of the brakes to all of the units in the train consist, thus reducing stopping distances. The 26-Electronic Controlled Pneumatics (ECP) system also creates a replenishable supply source of air since the transfer medium is through the electronics and not the pneumatics. Another advantage of electronic controlled pneumatics of the 26-Type braking systems is that it allows for trainline communication features to be built into the system. Also, an unlimited number of units may be placed within a train consist as the electronic communication capabilities of the system would allow for the units to react quickly to a reduction at the lead unit. This would result in significant economic advantages.

Thus, the present invention has been described in such full, clear, concise and exact terms as to enable any person skilled in the art to which it pertains to make and use the same. While the present invention has been described in relation to its use on a passenger car, note that this system is not limited to this use and may be applicable to other types of cars within a train consist, particularly ones that utilize 26-type braking control systems. It will be understood that variations, modifications, equivalents and substitutions for components of the specifically described embodiments of the invention may be made by those skilled in the art without departing from the spirit and scope of the invention as set forth in the appended claims.

What is claimed is:

1. A system for providing access to porting of a 26-Type car control valve so as to allow for electronic control of an air braking system in a train, such train including at least one locomotive and at least one car, said system comprising:

(a) an electronic controlled pneumatic car control unit placed on at least one such car for receiving at least a brake application and a brake release communication signal from such locomotive;

(b) an access plate which accesses porting of said 26-Type car control valve; and (c) a conversion block connected between said access plate and said electronic controlled pneumatic car control unit for providing entry to said electronic controlled pneumatic car control unit so as to achieve electronic control of said 26-Type car control valve.

2. A system as recited in claim 1 wherein said porting accessed comprises porting for a control reservoir, an auxiliary reservoir, a brake pipe, a 16 pipe, a 10 pipe, and a 16 pipe release.

3. A system as recited in claim 1 wherein said electronic controlled unit controls brake application.

4. A system as recited in claim 1 wherein said conversion block includes hook-up ports from which single car testing may be performed via said access plate.

5. A system as recited in claim 1 wherein said car control valve is one of a 26C and 26F control valve.

6. An access plate for accessing ports of a 26-Type brake control valve so as to allow for electronic control of an air braking system in a train comprising:

an access plate positioned between a 26-Type brake control valve and a conversion block wherein said access plate contains ports therein for connection to a plurality of ports on said 26-Type brake control valve and for providing access of these ports via said conversion block to an electronic controlled unit.

7. An access plate as recited in claim 6 wherein said access plate includes hook-up ports thereon which allow for single car testing of said brake control valve.

8. An access plate as recited in claim 6 wherein said porting accessed comprises porting for a control reservoir, an auxiliary reservoir, a brake pipe, a 16 pipe, a 10 pipe, and a 16 pipe release.

9. An access plate as recited in claim 6 wherein said brake control valve is one of a 26C and 26F control valve.

10. A system for performing single car brake testing in an electronically controlled air braking system in a train comprising:

an access plate for providing access to porting on a 26-Type car brake control valve, said access plate additionally including single car testing hook-up ports thereon such that a single car test of said 26-Type brake control valve may be performed from said hook-up ports.

11. A system for performing single car testing in an electronically controlled air braking system as recited in claim 10 wherein said access plate provides access to porting for a control reservoir, an auxiliary reservoir, a brake pipe, a 16 pipe, a 10 pipe, and a 16 pipe release.

12. A system for performing single car brake testing in an electronically controlled air braking system as recited in claim 10 wherein said car brake control valve is one of a 26C and 26F brake control valve.

13. A system for providing access to porting of a car control valve so as to allow for electronic control of an air braking system in a train, such train including at least one locomotive and at least one car, said system comprising:

(a) an electronic controlled pneumatic car control unit placed on at least one such car for receiving at least a brake application and a brake release communication signal from such locomotive;

(b) an access plate which accesses porting of such car control valve, said access plate including a plurality of piping or tubing; and (c) a conversion block positioned in a remote mounting arrangement and connected to said access plate via said plurality of piping or tubing, said conversion block providing entry to said electronic controlled pneumatic car control unit so as to achieve electronic control of such car control valve.

14. A system as recited in claim 13 wherein said conversion block includes hook-up ports from which single car testing may be performed.

15. An access plate for accessing ports of a control valve so as to allow for electronic control of an air braking system in a train comprising:

an access plate positioned between a brake control valve and a conversion block, said conversion block being positioned in a remote mounting location and being connected to said access plate via a plurality of piping and tubing, said access plate containing ports therein for connection to a plurality of ports on said brake control valve and for providing access of these ports to an electronic controlled unit.

* * * * *